United States Patent Office 3,432,476
Patented Mar. 11, 1969

3,432,476
SYNTHETIC LINEAR COPOLYTEREPHTHAL-
AMIDES AND SHAPED ARTICLES MADE
THEREFROM
Michichika Kuwabara and Kiyoshi Nawata, Hino-shi, Kiyokazu Tsunawaki, Mitaka-shi, and Seizaburo Sakakibara, Hino-shi, Japan, assignors to Teijin Limited, Osaka, Japan, a corporation of Japan
No Drawing. Filed Dec. 21, 1964, Ser. No. 420,183
Claims priority, application Japan, Dec. 30, 1963,
38/71,684
U.S. Cl. 260—78
Int. Cl. C08g 20/00, 20/20
6 Claims

ABSTRACT OF THE DISCLOSURE

Linear, isomorphous copolyamides constituted of 90-40 mol percent preferably 80-55 mol percent, of hexamethylene-β-alkyl-adipamide and 10-60 mol percent preferably 20-45 mol percent of hexamethylene terephthalamide which are useful for the production of shaped articles in the form of fibers, filaments and films.

This invention relates to novel, synthetic linear copolyterephthalamides of high crystallinity and excellent mechanical properties, particularly high Young's modulus, and shaped articles made therefrom, as well as the methods of their production.

So-called nylon 6 and nylon 66 are highly crystalline and have generally good mechanical properties, but their Young's moduli are remarkably low. In order to improve these low moduli, it has been long attempted to use terephthalic acid as one of the dicarboxylic acid components. However, hexamethylene terephthalamide/ε-caprolactam copolymer has lower melting point and decreased crystallinity at a terephthalamide content of about 5-25 mol. percent and these copolymers are not isomorphous [cf. Kobunshi Jikkengaku Koza (Lectures on Experiments in High Molecular Chemistry), vol. 11, p. 248, published from Kyoritsu Publishing Co. in 1958]. Therefore, fibers prepared therefrom also have unsatisfactory crystallinity, and their mechanical properties can hardly be said to be improved over those of known nylons.

The syntheses of hexamethylene terephthalamide/ hexamethylene adipamide copolymers were also attempted, in which case the copolymers were isomorphous and therefore they had good crystallinity [cf. O. B. Edgar and R. Hill, J. Polymer Science, 8 1-22 (1952)]. However when the hexamethylene terephthalamide content is sufficiently high to impart the fibers prepared therefrom improved mechanical properties, especially high Young's modulus, the copolycondensate has too high a melting point and causes coloring or decomposition during its polymerization or melt-spinning operation.

Accordingly, the object of this invention is to provide highly crystalline synthetic linear copolyterephthalamides having a suitable melting range, and shaped articles made therefrom as well as a method for their production.

From the synthetic linear copolyterephthalamides of this invention, fibers having excellent physical and mechanical properties, particularly high Young's modulus, can be obtained.

The synthetic linear copolyterephthalamides of this invention substantially consists of 90-40 mol. percent of hexamethylene β-methyl- or β-ethyl-adipamide units and 10-60 mol. percent of hexamethylene terephthalamide units, as the recurring structural units.

Such synthetic linear copolyterephthalamides are prepared by co-polycondensation of 10-60 mol. percent of terephthalic acid, 90-40 mol. percent of β-methyl- or β-ethyl-adipic acid, and substantially equimolar amount to the foregoing two of hexamethylene diamine.

The β-methyl adipic acid and β-ethyl adipic employed in this invention are the compounds represented by the formula below.

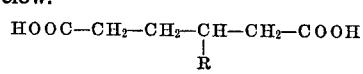

wherein R is methyl group or ethyl group.

Preparing the copolyamides of this invention, the required amounts of terephthalic acid and a β-alkyl-adipic acid within the above defined mol. percent range respectively may be co-polycondensed with a substantially equimolar amount to the foregoing two of hexamethylene diamine, by any known method for the production of polyamides, especially nylon 66.

For example, a mixture of the required amounts of terephthalic acid and β-methyl-, or β-ethyl-adipic acid and a substantially equimolar amount of hexamethylene diamine are measured with the precision sufficient to attain the desired molecular weight of the product, and the three components may be heated in the optional presence of a suitable solvent, such as water or alcohols.

It is known that the salts of terephthalic acid and hexamethylene diamine, and that of a β-alkyl-adipic acid and hexamethylene diamine may be prepared respectively, which are then each refined by recrystallization or other known method, mixed at the specified quantitative ratio, and heated to thereby be co-polycondensed in the optional presence of a viscosity stabilizer (molecular weight controlling agent) and a suitable solvent such as water or alcohols. The normally employed heating temperature in such a case ranges from 230° to 310° C.

In short, it is required in this invention that the sum of the molar numbers of the terephthalic acid and β-methyl-, or β-ethyl-adipic acid present in the reaction system for the co-polycondensation should be substantially equal to the molar numbers of the hexamethylene diamine. And at the time of the reaction, it is preferred that at least a minor amount of water should be present in the reaction system.

Regardless of which of the above described reaction methods is employed, it is useful to perform the reaction with stirring for the smooth progress thereof, or in an inert gaseous atmosphere such as nitrogen for the prevention of coloration, or to suitably elevate the pressure within the reaction vessel or reduce it for the restriction or acceleration of the reaction rate, if such should be necessary.

In this invention, it is preferred to perform the co-polycondensation reaction in the presence of a viscosity stabilizer (molecular weight controlling agent) as well known in connection with the production of 66-nylon. As the viscosity stabilizer (molecular weight controlling agent) any of the aliphatic, alicyclic or aromatic monoamines, diamines, monocarboxylic acids and dicarboxylic acids can be used. Among those, the most often employed include: straight chain aliphatic mono- or di-amines of 4-18 carbons, such as n-butyl amine, n-lauryl amine, hexamethylene diamine, decamethylene diamine, etc.; alicyclic mono- or di-amines such as cyclohexyl amine, benzyl amine, diaminocyclohexane, bis-amino-methyl-cyclohexane, etc.; aromatic mono- or di-amines such as β-naphthyl amine, α-naphthyl amine, 1-methyl-2,3,-diamino-benzene, etc.; aliphatic mono- or di-carboxylic acids of 2-18 carbons such as acetic acid, β-methyl- or β-ethyl-adipic acid, sebacic acid, etc.; alicyclic mono- or di-carboxylic acids such as hexahydrobenzoic acid, hexahydroterephthalic acid, etc.; aromatic mono- or di-carboxylic acids such as benzoic acid, terephthalic acid, isophthalic acid, etc.

Further in this invention it is preferred to perform the co-polycondensation reaction in the presence of a thermostabilizer and a photostabilizer, as commonly practiced for the production of 6-nylon and 66-nylon. As such a thermostabilizer, for example phosphoric acid, p-toluene sulfonic acid, tannin, copper halides such as cuprous chloride and cupric chloride, manganese chloride alkali halides etc. are particularly preferred. As the photostabilizer, it is preferred to use polyhydric phenols such as hydroquinone; or organic or inorganic acid salts of copper, manganese, etc.

Generally, when the copolyterephthalamide obtained by the co-polycondensation reaction of hexamethylene β-methyl- or β-ethyl-adipamide with hexamethylene terephthalamide contains less than 10 mol. percent of the hexamethylene terephthalamide unit, the fibers prepared from that copolyterephthalamide have Young's moduli and work recovery of about the same order as those of 6-nylon or 66-nylon. Again when the hexamethylene terephthalamide unit content of the copolyterephthalamide exceeds 60 mol. percent, the melting point of the product becomes undesirably high (higher than about 350° C.) to render the shaping operation difficult. For information, the relationship between the mol. percent of the hexamethylene terephthalamide unit and melting point of intrinsic viscosity [$\eta$] of the copolyterephthalamide of this invention is illustrated in Tables 1 and 2 below, in which tables the case wherein hexamethylene terephthalamide unit is zero being also given for referential purpose.

trinsic viscosities within the range of 0.6–1.5, preferably 0.9–1.3, are used.

For example, the copolyamide containing 38.5 mol. percent of terephthalic acid has a melting point of 262° C., which has a melt viscosity of 400 poises at 267° C. when it has an intrinsic viscosity of 0.6, and that of 4000 poises at 290° C. when its intrinsic viscosity is 1.5. Thus in either case it can be melt-spun. On the other hand, when the intrinsic viscosity falls outside the range of 0.6–1.5, the result is either that the melt viscosity is too high or too low, and melt-spinning is rendered difficult. Also the resultant fibers have little practical utility.

As the spinning apparatus, an extruder-type in which a screw is provided in a heating cylinder, or that in which the compressed polymer is melted with a plunger on a heated and perforated disc, may be used. In either case, normally a gear pump is provided at the front-end of the apparatus in order to make the flow amount of the molten polymer constant. The spinneret is mounted behind the gear pump.

For easier handling normally and preferably the copolyamides are first made into cylindrical or prismal chips of which the diameter or one side is in the order of 2–4 mm., before the spinning operation. Depending on the types of spinning machine employed, however, powder may also be used.

For smooth spinning operation, it is preferred to dry such chips or powder before the spinning at temperatures above room temperature but below the melting point, TABLE 1.—MELTING POINT AND INTRINSIC VISCOSITY [$\eta$] OF COPOLYAMIDES OF HEXAMETHYLENE β-METHYLADIPAMIDE AND HEXAMETHYLENE TEREPHTHALAMIDE

| Mol. percent of hexamethylene terephthalamide unit | 0 | 10 | 20 | 30 | 40 | 45 | 50 | 60 |
|---|---|---|---|---|---|---|---|---|
| Melting point (° C.) | 212 | 217 | 226 | 242 | 266 | 285 | 305 | (1) |
| [$\eta$] | 1.03 | 1.16 | 1.20 | 1.14 | 1.18 | 1.17 | 1.03 | 1.1 |

1 About 350.

TABLE 2.—MELTING POINT AND INSTRINSIC VISCOSITY [$\eta$] OF COPOLYAMIDES OF HEXAMETHYLENE β-ETHYL-ADIPAMIDE AND HEXAMETHYLENE TEREPHTHALAMIDE

| Mol. percent of hexamethylene terephthalamide unit | 0 | 10 | 20 | 30 | 40 | 45 | 50 | 60 |
|---|---|---|---|---|---|---|---|---|
| Melting point (° C.) | 156 | 162 | 186 | 221 | 260 | 280 | 301 | (1) |
| [$\eta$] | 0.93 | 0.98 | 1.01 | 1.12 | 1.18 | 1.09 | 1.05 | 0.96 |

1 About 350.

In the above tables, intrinsic viscosities were measured in m-cresol at 25° C. Intrinsic viscosities appearing in the specification hereafter were all measured under the said conditions.

The copolyterephthalamides of this invention can be melt-extruded or dissolved in a suitable solvent and made into fiber, film and other shaped articles. As the shaping operation, particularly melt-extrusion is suitable.

In the case of preparing shaped articles by melt-extrusion, when the copolyamide has too high a melting point, during the melting operation thermal decomposition may take place, or at least coloration of the shaped product tends to be caused. Therefore it is preferred that the melting point should be below 300° C. For this reason, in this invention, copolyterephthalamides containing 20–45 mol. percent of hexamethylene terephthalamide unit as the recurring structural unit are particularly suited for the shaping operation. Further, the copolyterephthalamides of this invention may contain, besides the recurring units of the said two components, minor amounts of other acid amide components, for example, recurring structural units of hexamethylene isophthalamide, hexamethylene adipamide, etc.

In preparing filaments by melt extrusion from the co-polyterephthalamides of this invention, those having inunder atmospheric or reduced pressure and optionally in an inert gaseous current.

Melt-spinning of the copolyamides mixed with pigments such as titanium oxide is also possible.

The fibers thus spun from the copolyamides are drawn and heat-treated to become qualified for practical uses. Preferably the drawing is performed at 60–160° C. with the draw ratio of 2–6×, preferably 2.5–5×. The preferred heat-treating temperature range is 120–200° C.

The copolyterephthalamide fibers of this invention have excellent mechanical properties, particularly, high Young's moduli. Both 6-nylon and 66-nylon fibers have Young's modulii of about 20–30 g./d. On the other hand, the copolyamide fiber of this invention prepared from 38 mol. percent of terephthalic acid, 62 mol. percent of β-methyl adipic acid and substantially equimolar amount to the said two of hexamethylene diamine has a Young's modulus of 45–65 g./d. Therefore, it can be understood from this difference in Young's modulus, that the copolyamides prepared by the method of this invention have entirely different, excellent properties from those of heretofore known nylons.

And, this copolyamide fiber has excellent work recovery, much better than that of 66-nylon fiber given for comparison as in Table 3 below. From this point it can also be understood that the copolyamide of this invention is an excellent polyamide different from known nylon.

TABLE 3.—COMPARISON OF WORK RECOVERY
[Relaxation time, 30 seconds]

| Elongation, percent | Copolyamide of this invention | 66-nylon |
| --- | --- | --- |
| 1.0 | 87 | 67 |
| 3.0 | 71 | 58 |
| 5.0 | 57 | 55 |

The copolyamides of this invention are presumably isomorphous from the results of the foregoing Tables 1 and 2. Because, for example, the melting point of hexamethylene terephthalamide/hexamethylene-β-methyl-, or β-ethyl-adipamide co-polycondensation polymer does not become the minimum at the increase in mol. percent of the hexamethylene terephthalamide unit. In fact, the copolyamides of this invention show high crystallinity in all instances.

The copolyamides prepared in accordance with this invention have good thermal stability, and can be melted and shaped into fiber, film, and other commonly seen shaped structures (those shaped with extruders, injection moulders, vacuum moulders, inflation moulders, etc.). Again, as they have good crystalline property, the shaped fibers, films etc. can be stretched at suitable temperatures. For example, the said copolyamide containing 38 mol. percent of terephthalic acid and 62 mol. percent of β-methyl-adipic acid (intrinsic viscosity=1.13) was spun at 270° C. with draft ratio of 40×, drawing temperature of 100° C. and draw ratio of 4.5×, to give a fiber having a strength of 6.1 g./d., an elongation of 26%, a Young's modulus of 52 g./d., and a crystallinity of 40%. This fiber had excellent dyeability and weather-resistance, and can be used by itself as long or staple fibers, and can as well be mix-spun or mix-woven with wool, cotton, linen, viscose fibers, acetate fibers, polyester fibers, acrylic fibers and nylon.

Hereinafter this invention shall be explained with reference to the examples, it being understood that the examples are not included to limit the scope of this invention in any manner.

EXAMPLE 1

A crude β-methyl adipic acid prepared by oxidation of 4-methylcyclohexanol with conc. nitric acid was twice acid salt were taken at the ratios shown in Table 4, and each mixture was put in an autoclave provided with a stirrer and a bottom valve, with about 600 ml. of water recrystallized from water as the solvent, and a refined β-methyl-adipic acid of M.P. 93–94.5° C. was obtained. A suitable amount of the same was separated and reacted with about an equimolar amount of hexamethylene diamine in 99% ethanol to form a salt. The resultant salt was refined by recrystallization from 99% ethanol, and dried at about 50° C. and a reduced pressure. The salt had a M.P. of 146–7° C. The elemental analysis of this salt showed C=56.19%, H=10.29%, N=10.07%, and its molecular structure corresponded to $$NH_2(CH_2)_6NH_2 \cdot HOOCCH_2CH(CH_3)CH_2CH_2COOH$$

having no water of crystallization.

Then a suitable amount of terephthalic acid and about an equimolar amount of hexamethylene diamine were reacted in an ethanol-water mixed solvent (volume ratio 1:1) to form a salt, which was refined by recrystallization from ethanol-water mixed solvent (volume ratio 5:1) and then dried at about 50° C. and a reduced pressure. The salt had a M.P. of 265–7° C., and comprised, as the result of an elemental analysis, C=56.50%, H=7.95%, N=9.22%. Therefore its molecular structure corresponded to $NH_2(CH_2)_6NH_2 \cdot HOOCC_6H_4COOH \cdot H_2O$, containing one molecule of water of crystallization.

The thus obtained hexamethylene diamine-β-methyl adipic acid salt and hexamethylene diamine terephthalic and 6.0 g. of terephthalic acid as a viscosity stabilizer. The content was heated with stirring to 280° C. (the oil bath temperature) within the first 1.5 hours, and continued to be heated at the said temperature for an additional 1.5 hours with stirring. At that time the pressure gauge showed a pressure of about 35 kg./cm.² Then the valve was opened to discharge the steam and establish atmospheric pressure. Under atmospheric pressure and in the air-tight vessel, the reaction system was maintained at 280° C. for a further two hours, and stirred. When the polycondensation was thus completed, the bottom valve was opened and the polymer was taken out in the form of a continuous line of about 2.5 mm. diameter, and immediately passed through cooling water to be wound up.

Thus obtained polymers were all white and crystalline, and had melting points and intrinsic viscosities as shown in Table 4 below.

TABLE 4.—MELTING POINTS AND INTRINSIC VISCOSITIES OF THE CO POLYAMIDES

|  | Hexamethylene diamine-β-methyl-adipic acid salt | | Hexamethylene diamine-terephthalic acid salt | | Melting point (° C.) | Intrinsic viscosity (η) |
| --- | --- | --- | --- | --- | --- | --- |
|  | Mol. number | Mol. percent | Mol. number | Mol. percent | | |
| Sample No.: | | | | | | |
| a | 4.5 | 90 | 0.5 | 10 | 217 | 1.16 |
| b | 4.0 | 80 | 1.0 | 20 | 226 | 1.10 |
| c | 3.5 | 70 | 1.5 | 30 | 242 | 1.14 |
| d | 3.0 | 60 | 2.0 | 40 | 266 | 1.09 |
| e | 2.5 | 50 | 2.5 | 50 | 305 | 1.03 |

EXAMPLE 2

Hexamethylene diamine-β-methyl-adipic acid salt 0.31 mol. and hexamethylene diamine-terephthalic acid salt 0.19 mol., both prepared as described in Example 1, were placed in a flask equipped with a stirrer, a gas-inlet tube and a gas-discharge tube, and to which 25 ml. of water, 25 ml. of ethanol and trace amounts of p-toluene sulfonic acid and cupric chloride as the stabilizer were added: While passing thereinto nitrogen gas from the gas-inlet tube, the system was heated and stirred. The salts were dissolved, followed by distillation of ethanol and water and condensation polymerization took place. The temperature was raised to 275° C. within about 1 hour, and thereafter stirring was continued for 2 hours at the said temperature. Thus a white polymer having a melting point of 260° C. and an intrinsic viscosity of 0.97 was obtained.

EXAMPLE 3

116.2 grams of pure hexamethylene diamine was placed in an autoclave, and dissolved in 200 ml. of water, to which 108.0 g. of pure β-methyl-adipic acid, 56.1 g. of pure terephthalic acid, 1.90 g. of lauric acid as the viscosity stabilizer and a minor amount of manganese chloride were added and dissolved with heating under stirring. The autoclave was closed, and the air inside was thoroughly replaced by nitrogen gas of 99.999% purity. Thereafter the autoclave was heated in an oil bath. When the pressure gauge indicated a pressure of 32 kg./cm.$^2$, the valve was opened to discharge the steam and then closed again to continue the heating. When the pressure reached 5 kg./cm.$^2$, the valve was once more opened to discharge the steam. Thereafter, heating was continued under atmospheric pressure until the temperature reached 280° C., which required about 1.5 hours. During the heating under atmospheric pressure, the discharge end of the opened valve was connected to a pipe, of which the other end was immersed in water. Thus the reaction system was maintained at 280° C. for an additional 1.5 hours. Finally, the system was heated to the same temperature for 30 minutes under a reduced pressure of 2 mm. Hg. After air-cooling, a white polymeric mass was obtained, which had a melting point of 253° C. and an intrinsic viscosity of 1.15.

EXAMPLE 4

In place of the 108.0 g. of β-methyl-adipic acid used in the above Example 3, 78.3 g. of β-ethyl-adipic acid was used, and the amount of terephthalic acid was increased to 91.3 g. Otherwise the same components as in Example 3 were polycondensed in the manner of Example 3, except that a stirrer was provided in the reaction vessel and the reaction was performed under stirring. A white copolyamide of good crystallinity was obtained, which had a melting point of 315° C. and an intrinsic viscosity of 0.94.

EXAMPLE 5

The copolyamide synthesized in Example 2 was shaped into chips and melt-spun. The spinneret employed had 25 orifices of 0.3 mm. diameter, and the vicinity thereof was heated to 290° C. The draft ratio was 80×. Thus obtained fiber was adhered with an aqueous dispersion of a polyoxyethylene alkylether-type oil agent, and thereafter wound up into a bobbin, and drawn by 3.8× of single winding onto a ceramic hot pin of 65 mm. diameter which was heated in advance to 80° C. The drawn fiber was taken up onto a bobbin, and heated in that state at 160° C. for 1.5 minutes. Thus a fiber having a denier of 55 (as 25 strands of filaments), a strength of 5.9 g./d., an elongation of 27% and a Young's modulus of 48 g./d. was obtained. This fiber had high affinity to acid dyes and disperse dyes, and could be dyed therewith to a very deep color.

EXAMPLE 6

The copolyamide sample No. c obtained in Example 1 was chipped and melt-spun. The spinneret provided on the spinning machine had 25 orifices of 0.3 mm. diameter, and the draft ratio was 90×. Thus obtained fiber was adhered with an oil emulsion and wound up onto a bobbin, followed by drawing by 3.7× as wound single time onto a ceramic hot bottle heated in advance to 75° C. The drawn fiber was immediately subjected to a heat-treatment consisting of a passage onto a metallic hot plate of 50 cm. in length and which was heated to 200° C., and then wound up onto a bobbin. The resultant fiber had a denier of 54 (as 25 strands of filaments), a strength of 5.3 g./d., an elongation of 29% and a Young's modulus of 54 g./d. This fiber also had excellent dyeability and could be dyed deeply at 90–100° C.

EXAMPLE 7

The copolyamide sample No. d obtained in Example 1 was chipped and melt-spun. The spinneret employed had 25 orifices of 0.25 mm. diameter, and the vicinity thereof was heated to 285° C. The draft ratio was 60×. The resultant fiber was adhered with an oil emulsion, wound up, and drawn by 3.9× using a hot metallic plate heated to 83° C. The fiber then was cut by 4 inches and heat-treated for 15 minutes free of tension. Thus obtained staple cotton had a denier of 2.3 (as monofiber), a strength of 4.1 g./d., an elongation of 38% and a Young's modulus of 41 g./d. This staple cotton showed very excellent dyeability with acid dyes and disperse dyes.

EXAMPLE 8

The copolyamide sample c obtained in Example 1 was extruded at 285° C., and biaxially drawn by 3.0× at 85° C. A transparent film sheet was obtained, which showed good dyeability to disperse dyes and acid dyes.

What we claim is:

1. A linear copolyterephthalamide composed essentially of from 90 to 40 mol. percent of recurring structural units of a hexamethylene β-alkyl-adipamide and from 10 to 60 mol. percent of recurring structural units of hexamethylene terephthalamide, said alkyl group being selected from the group consisting of methyl and ethyl.

2. A linear copolyterephthalamide according to claim 1, composed of 80–55 mol. percent of recurring structural units of a hexamethylene β-alkyl-adipamide and 20–45 mol. percent of recurring structural units of hexamethylene terephthalamide.

3. A linear copolyterephthalamide according to claim 1, having an intrinsic viscosity as measured at a temperature of 25° C. in m-cresol of from 0.6 to 1.5.

4. A linear copolyterephthalamide according to claim 2, having an intrinsic viscosity as measured at a temperature of 25° C. in m-cresol of from 0.6 to 1.5.

5. A fiber of the copolyamide according to claim 2.

6. A film of the copolyamide according to claim 2.

References Cited

UNITED STATES PATENTS

| | | | |
|---|---|---|---|
| 2,130,948 | 9/1938 | Carothers | 260—78 |
| 2,752,328 | 6/1956 | Magat | 260—78 |
| 2,831,834 | 6/1958 | Magat | 260—78 |
| 2,918,454 | 12/1959 | Graham | 260—78 |
| 3,206,438 | 9/1965 | Jamison | 260—78 |
| 3,232,909 | 2/1966 | Werner | 260—78 |

FOREIGN PATENTS 794,365   4/1958   Great Britain.

OTHER REFERENCES

Edgar et al.: Journal of Polymer Science, vol. 8, 1952, pp. 17–18.

Floyd: Polyamide Resins, second edition, 1966, pp. 15–16.

HAROLD D. ANDERSON, Primary Examiner.

U.S. Cl. X.R.

260—33.4, 45.7, 45.9, 45.75, 45.85, 33.4; 264—176, 210